United States Patent Office 2,716,653
Patented Aug. 30, 1955

2,716,653

SOLUBLE VAT DYE INTERMEDIATES

William B. Hardy, Bound Brook, and Harry E. Westlake, Jr., Somerville, N. J., assignors to American Cyanamid Company, New York, N. Y., a corporation of Maine No Drawing. Application May 21, 1952,
Serial No. 289,202

11 Claims. (Cl. 260—371)

This invention relates to leuco sulfuric acid half esters of 2-amino-3-alkylsulfonyl anthraquinone having the following formula:

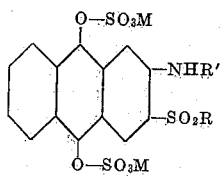

in which R is an alkyl radical of not more than four carbon atoms, R' is hydrogen or an acyl radical and M is a monovalent cation.

The new compounds are intermediates for the production of leuco sulfuric acid half esters of the corresponding indanthrene dyestuff having the following formula:

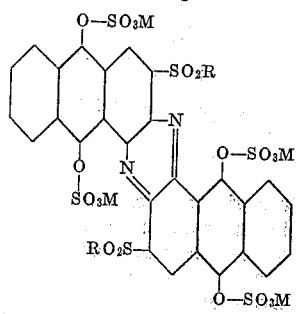

The new indanthrene vat dyestuffs show good fastness to light and oxidation, and are of a desirable bright green-blue shade. In these indanthrenes, the alkyl sulfonyl groups behave in an anomalous manner: instead of lightening the shade and exerting a hypsochromic effect, which is normal when alkyl sulfonyl groups are introduced into other dyes, in this case the reverse takes place; a deeper shade is obtained, the alkyl sulfonyl groups exhibiting a bathochromic effect. The indanthrene vat dyestuffs for which the compounds of the present invention are intermediates are not claimed in the present application, forming the subject matter of our co-pending application Serial No. 289,201, filed May 21, 1951.

The leuco sulfuric acid half esters of the present invention are prepared from the corresponding 2-acetylaminoanthraquinonyl-3-alkyl sulfones which are not claimed in the present application forming the subject matter of our co-pending application Serial No. 289,203, filed May 21, 1951.

The choice of acyl group on the amino group is not of particular significance, the purpose of the acylation being merely to protect the amino group during esterification. Typical acyl groups are the following: formyl, acetyl, propionyl, butyryl, valeryl, and other aliphatic carbonyl groups, and benzoyl, naphthoyl, thenoyl. Obviously, of course, the acyl group must not have substituents which will enter into the reaction. Since the particular acyl group is of no significance, we prefer to use acyl groups from the cheap, low molecular weight acids, the acetyl group being preferred.

The alkyl group in the 3-alkyl sulfonyl group may be any alkyl having not more than four carbon atoms, such as methyl, ethyl, propyl, isopropyl, butyl, isobutyl, and secondary butyl.

While the preparation by the process in the present invention results in the first instance in a crude product in which the amino group is acylated, the principal use of the compounds of the present invention in forming indanthrenes requires that the amino group be free and this may be effected very simply by a conventional hydrolysis reaction. The present invention, therefore, includes not only the desired 2-amino compounds but also the acylamino compounds from which they were prepared.

While it is not desired to limit the present invention to any particular method of preparing the compounds, a very satisfactory process is described in the examples and constitutes a preferred method.

The leuco sulfuric acid half esters of the present invention are normally obtained in the form of their metal salts. The particular metal or cation on the sulfonic acid groups are more or less immaterial as they do not materially affect the use of the compounds in the succeeding ring closing reaction to produce indanthrenes. Accordingly, any of the common cations may be used, such as, for example, sodium, potassium, lithium, quaternary organic bases and the like. Because of solubility characteristics, there is some advantage in using the potassium salt, but the invention is in no sense limited thereto.

The invention will be described in greater detail in conjunction with the following specific examples, the parts being by weight unless otherwise specified:

Example 1

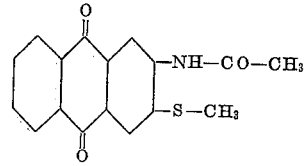

A mixture of 83 parts of sodium sulfide, 21.2 parts of sulfur, 360 parts of pyridine, and 36 parts of water is stirred and heated until a complete solution is obtained. To this is added 68.6 parts of 2-acetylamino-3-bromo anthraquinone. The mixture is stirred and heated until the reaction is complete and then is drowned in 2000 parts by volume of water. The drowned mixture is distilled until the pyridine is removed. The hot residual solution is treated with 120 parts of sodium chloride. When the mixture is cooled to 20° C., the sodium mercaptide precipitates. This is filtered and washed with 400 parts by volume of 20% brine, and then reslurried in 200 parts by volume of water. Eighty parts of soda ash is added to the slurry, which is then stirred at room temperature while 72 parts by volume of dimethyl sulfate is added gradually. The mixture is then stirred overnight. A yellow precipitate appears which is filtered, washed neutral, and dried. This can be recrystallized from dichlorobenzene to give green-yellow crystals of 2-acetylaminoanthraquinonyl-3-methyl sulfide.

Example 2

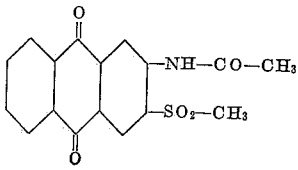

A mixture of 74 parts of 2-acetylaminoanthraquinonyl-3-methyl sulfide and 700 parts by volume of glacial acetic acid is stirred while a solution of 100 parts of potassium permanganate in 30 parts of hot water is added. The permanganate is washed into the mixture with an additional batch of 700 parts by volume of acetic acid. The mixture is stirred at the boil until oxidation is complete. It is then cooled to 70°, and a quantity of sodium bisulfite is added sufficient to decompose the precipitated manganese dioxide. The mixture is drowned in 2000 parts by volume of ice and water. The precipitated 2-acetylaminoanthraquinonyl-3-methyl sulfone is filtered, washed neutral, and dried. The sulfone can be recrystallized from dichlorbenzene, giving pale yellow crystals.

*Example 3*

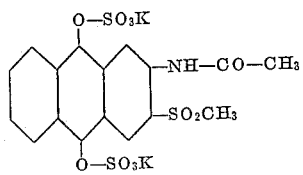

To 248 parts of alpha picoline is added gradually below 30° C. 89.6 parts of chlorsulfonic acid. The mixture is stirred until thoroughly mixed and then warmed to 40° C. A finely divided mixture of 70 parts of 2-acetylaminoanthraquinonyl-3-methyl sulfone and 26.8 parts of finely divided iron is added gradually to the chlorsulfonic acid-picoline mixture. The mixture is then stirred at 40° C. until reduction and esterification is complete. It is drowned in a solution of 191.5 parts of sodium carbonate and 1150 parts by volume of water. The alpha picoline is removed by vacuum distillation. The mixture is filtered and the precipitate is washed with hot water to a clear wash. The filtrate is salted to 23% potassium chloride concentration by volume and cooled to 20° C. The precipitated bright yellow diester potassium salt is filtered and washed with saturated alkaline potassium chloride solution, followed by methanol, and dried under a vacuum. The leuco sulfuric acid ester potassium salt of 2-acetylaminoanthraquinonyl-3-methyl sulfone is obtained. This is a bright yellow crystalline solid, quite soluble in water. The leuco diesters of other 2-acylaminoanthraquinonyl-3-methyl sulfones, such as propionyl and benzoyl, can be prepared similarly.

*Example 4*

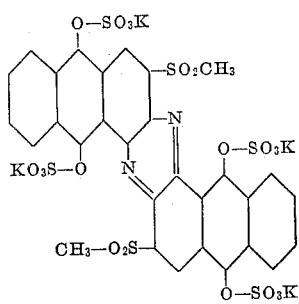

52 parts real of the esterified 2-acetylaminoanthraquinonyl-3-methyl sulfone, 490 parts by volume of water, and 44 parts by volume of a 50% aqueous sodium hydroxide solution are heated gradually to 75° C. and then held at 75°–80° until hydrolysis of the acetylamino group is complete. The free amino compound thus prepared can be isolated by salting out, or can be oxidized to form the indanthrene as follows. Nickel dioxide, prepared from 64 parts of nickelous chloride is added in the form of a wet cake thoroughly stirred in at 80° C. until ring closure has been effected, then the reaction mixture is filtered hot, the cake washed with hot water and the filtrate concentrated under reduced pressure to a volume of about 400 parts. Sufficient potassium chloride is then added to produce a 15% concentration by volume. The mixture is cooled. The potassium salt of the indanthrene tetraester precipitates out, is filtered and washed with a saturated potassium chloride solution. The product is a brown crystalline product which is soluble in water giving a solution which fluoresces green on dilution. If desired, it may be purified further by resalting from water with potassium chloride. When dyed by the usual methods, cellulose fibers are dyed a bright green-blue of excellent fastness, especially to light.

*Example 5*

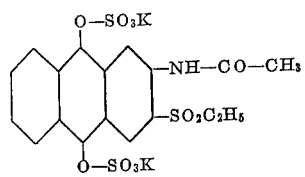

The procedure of Examples 1 to 3 is followed replacing the dimethyl sulfate with diethyl sulfate. The hydrolyzed 3-amino disulfuric half ester may be isolated if desired by salting out and filtration, or it may be oxidized directly with nickel dioxide as described in Example 4 to produce the corresponding indanthrene dyestuff. This product is a brown crystalline solid, soluble in water, the solution fluorescing green on dilution. When dyed on cellulose fibers by the usual method, bright green-blue shades are obtained of good fastness.

*Example 6*

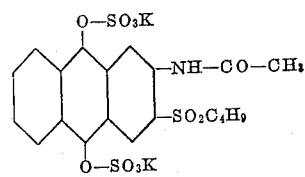

The procedure of Examples 1 to 3 is followed, replacing the methylation procedure of Example 2 by slurrying the 2-acetylamino-2-mercapto anthraquinone in 1000 parts by volume of ethanol, adding 37 parts of butyl iodide, and stirring at the boil. The yellow precipitate forms immediately, it is preferably not filtered until the reaction mixture has been cooled and stood for sufficient time to result in complete precipitation. The diester produced is a bright yellow crystalline solid which is soluble in water. After hydrolysis of the acetyl group, as described in Example 4, the free amino compound may be isolated, or preferably, transformed into the corresponding indanthrene dyestuff by the procedure of Example 4. A dye is obtained which dyes cellulose fibers by the usual processes bright greenish blue.

*Example 7*

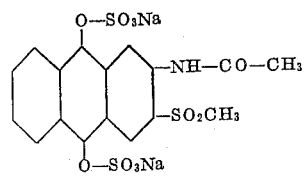

The procedure of Examples 1 to 3 is followed but the isolation is carried out by means of a sufficient quantity of sodium salt to give the necessary concentration of sodium ions to produce corresponding sodium salt. This product when hydrolyzed and transformed into the indanthrene dyestuff by the procedure of Example 4 produces a dye which can be used in exactly the same manner as the product of Example 4 to produce the same shades.

We claim:
1. Leuco sulfuric acid half esters of the formula

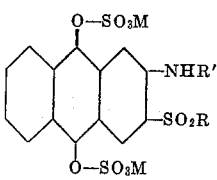

wherein R represents an alkyl group of not more than four carbon atoms, R' represents a radical selected from the group composed of hydrogen and an acyl radical, and M is a monovalent cation.

2. Leuco sulfuric acid half esters of the formula

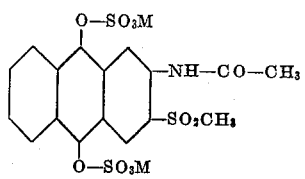

wherein M is a monovalent cation.

3. The leuco sulfuric acid half ester of the formula

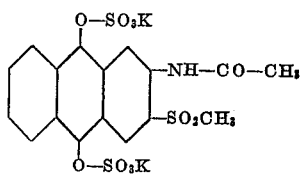

4. Leuco sulfuric acid half esters of the formula

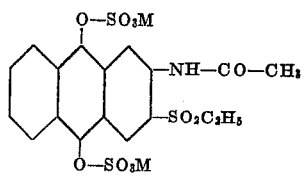

wherein M is a monovalent cation.

5. The leuco sulfuric acid half ester of the formula

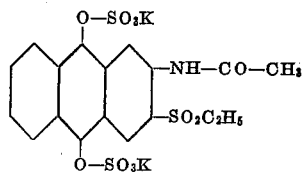

6. Leuco sulfuric acid half esters of the formula

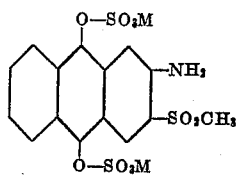

wherein M is a monovalent cation.

7. The leuco sulfuric acid half ester of the formula

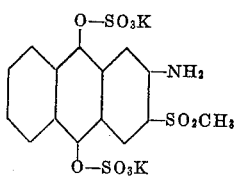

8. Leuco sulfuric acid half esters of the formula

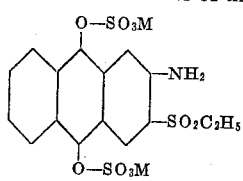

wherein M is a monovalent cation.

9. The leuco sulfuric acid half ester of the formula

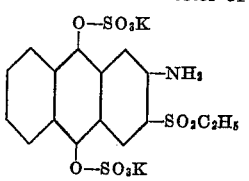

10. Leuco sulfuric acid half esters of the formula

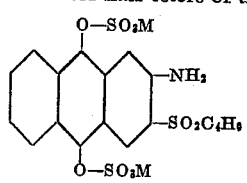

wherein M is a monovalent cation.

11. The leuco sulfuric acid half ester of the formula

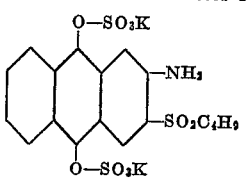

References Cited in the file of this patent
UNITED STATES PATENTS

| | | |
|---|---|---|
| 1,949,299 | Fairweather et al. | Feb. 27, 1934 |
| 2,176,630 | Klein | Oct. 17, 1939 |